United States Patent
Price

[15] 3,648,520
[45] Mar. 14, 1972

[54] WATER METER FREEZE PROTECTOR

[72] Inventor: Duane L. Price, 203 East Briar, Dodge City, Kans. 67801

[22] Filed: July 13, 1970

[21] Appl. No.: 54,211

[52] U.S. Cl. ..................................................73/277
[51] Int. Cl. ..................................................G01f 15/10
[58] Field of Search .................73/277, 201; 220/9 R, 9 F

[56] References Cited

UNITED STATES PATENTS

| | | | |
|---|---|---|---|
| 1,267,389 | 5/1918 | Doul | 73/201 |
| 582,354 | 5/1897 | Hoppes | 73/201 |
| 3,416,692 | 12/1968 | Cline et al. | 220/9 F |
| 3,168,828 | 2/1965 | Taylor | 73/201 |

Primary Examiner—Jerry W. Myracle
Attorney—Fishburn, Gold and Litman

[57] ABSTRACT

A water meter freeze protector structure wherein a water meter having a body with an upstanding register portion is located in the lower portion of a chamber formed by the wall of a meter box and a cover closing the upper end of said box. A generally horizontal wall member resting on the meter body and having an outer periphery engaged with the inner surface of the meter box and an opening aligned with and receiving the meter register portion, said wall member being of an insulating material such as synthetic resin foam and forming an insulating barrier between the portion of the chamber containing the water meter and any cold temperatures in the upper portion of the chamber caused by sub-zero atmospheric temperatures.

5 Claims, 3 Drawing Figures

Patented March 14, 1972
3,648,520
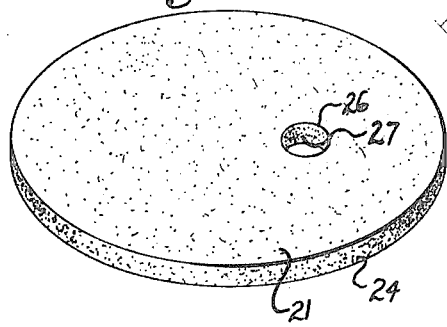
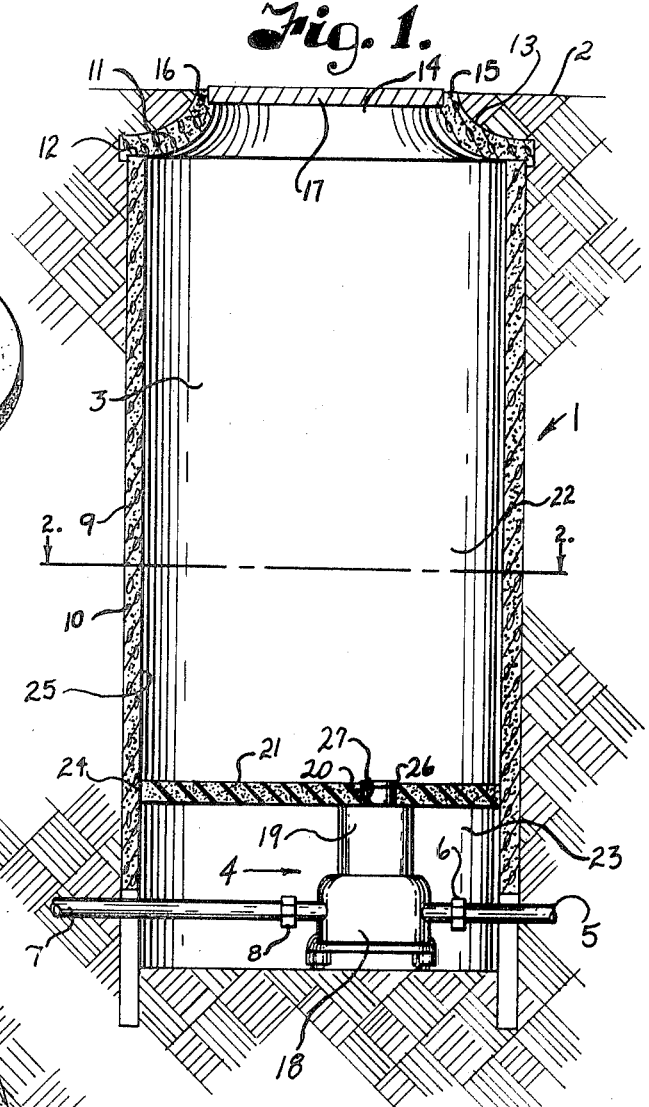
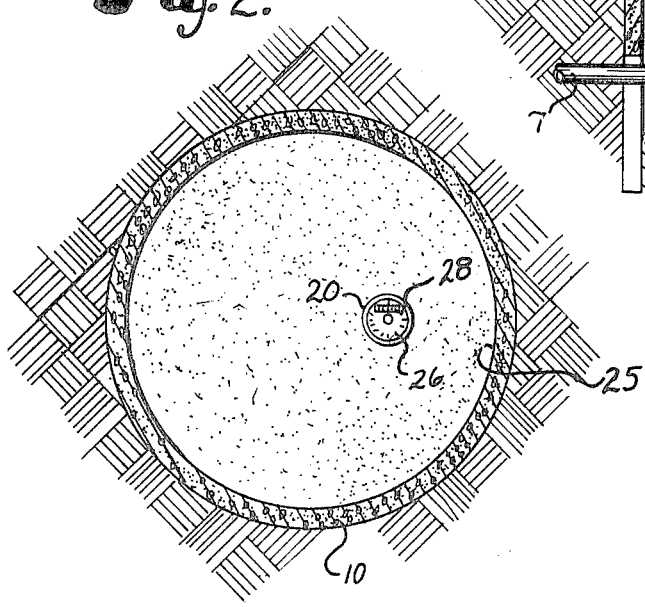
INVENTOR.
Duane L. Price
BY
Fishburn, Gold & Litman
ATTORNEYS

WATER METER FREEZE PROTECTOR

The invention relates to water meter installations and more particularly to freeze protection therefor.

In the distribution of water in cities and the like by municipal water departments or private utilities, accessibility to meters is desirable in order to facilitate meter reading. It has, therefore, become the practice to place water meters in what is called a meter well, which is primarily an underground chamber, the lower portion of which is usually approximately the depth of the water pipe extending from the meter to the house being served. Such a meter well usually has walls formed by meter box with a removable cover at the upper end whereby removal of the cover permits reading of the meter. In cold climates the cold temperatures will penetrate through the cover and into the meter well and freeze the meter even though the water line is below the frost line in the ground. Therefore, in many areas having danger of sub-zero weather it is common practice to fill the interior of the meter box with straw, or other insulation material to protect the meter, however, when this is done, it is impossible to read the meter during the winter months, or until the material filling the meter box is removed in the spring. There have been attempts to solve the problem by multiwall structures of meter boxes, but they are expensive to construct and install.

The principal objects of the present invention are: to provide a water meter freeze protection structure that insulates the meter from the cold penetrating the meter box and permits reading of the meter while in place; to provide such a structure utilizing conventional meter box structures and meter locations; to provide such a structure in the form of a wall of insulation engaging the inner surfaces of the meter box walls and having an opening that closely fits the register portion of the meter so the register portion extends therethrough and is visible for reading; and to provide such a structure that is economical to manufacture, easily installed and that is capable of long trouble free life.

Other objects and advantages of this invention will become apparent from the following description taken in connection with the accompanying drawings wherein are set forth by way of illustration and examples certain embodiments of this invention.

FIG. 1 is a vertical sectional view through a meter well with a meter and freeze protector embodying my invention.

FIG. 2 is a transverse sectional view through the meter well taken on the line 2—2, FIG. 1.

FIG. 3 is a perspective view of the insulation member.

Referring more in detail to the drawings:

The reference number 1 generally designates a meter well located below ground surface 2 providing a chamber 3 with a water meter 4 positioned in the lower part of the chamber. A water pipe 5 leading from a source of supply is connected to the meter as at 6, and a water service line 7 is connected to the meter as at 8, and extends from the meter well to a house or the like to be served.

A meter box 9 is positioned in the meter well and has substantially vertical walls 10 lining said well. The meter box may be of any suitable structure and material and the cross section may be such to define a chamber of any suitable geometric shape. In the structure illustrated, the meter box 9 is formed to concrete and is circular in cross section, preferably open at both ends. A closure cap may be applied to the upper end of the meter box, however, in the structure illustrated, the box is provided with a throat member 11 seated on the upper end 12 of the walls 10, said throat member having a wall 13 inclined inwardly and upwardly and terminating in a reduced sized opening 14 at the upper end 15 thereof. It is preferred that the throat member have a recess or seat 16 to removably support a cover or lid 17 whereby removal of the cover 17 provides access to the interior of the chamber 3. The meter box, throat member, and cover are preferably arranged whereby the upper end 15 of the throat is adjacent to but above the ground level 2. The meter box is of such a length or height whereby when the meter 4 is positioned in the lower portion of the chamber 3 the pipes 5 and 7 are substantially below any normal frost line so that the earth will provide a protection that would normally keep the pipes from freezing.

The meter 4 has a body 18 with a bonnet portion 19. A register portion 20 containing dials for visual reading of the quantity of water measured by the meter is arranged in upstanding relation to the bonnet portion 19. While the meter is preferably generally centrally located relative to the vertical center of the meter box 9, it is common for it to be offset to some extent as accurate centering is unnecessary. With an installation with the meter in chamber 3 the cover 17, which is usually of metal, retards air movement to and from said chambers and retards changes in temperature. This cover provides some protection, but in extremely cold weather, as for example, below zero weather, the temperature in the chamber 3 may be substantially lower than the temperature of the ground surrounding the lower part of the meter box. This lower temperature in the chamber can result in freezing of water in the meter and damage to the meter.

In the illustrated structure a freeze protector is positioned within the meter box above the meter body. The freeze protector is a wall member 21 formed of a generally rigid insulating material supported above the meter body to substantially divide the chamber in the meter box into an upper and lower compartment 22 and 23, respectively, with the meter in the compartment 23. The wall 21 has a peripheral edge 24 that frictionally engages the inner surface 25 of the meter box, said engagement preferably being a slidable but snug fit. The wall 21 has an opening 26 aligned with the register portion 20 of the meter, said opening being defined by edges 27 that snugly engage the exterior surface of the register portion. It is preferred that the wall member 21 be a suitable synthetic resin foam having sufficient rigidity to extend substantially horizontally across the meter box with the portions adjacent the meter box resting thereon to support said wall 21. Examples of suitable material for the wall 21 is substantially rigid foams made from styrene, polyethylene, polyurethane, or the like, with a density of from one-half to 4 pounds per cubic foot. Also, the thickness can vary depending on the extremes of temperature that may be encountered, as for example, a three-fourth inches thickness might be suitable for areas having mild winters, with a thickness of 1½ inches where the temperatures frequently encountered are 15° below zero. In colder climates the thickness may be increased up to three inches.

In installing the freeze protection, it is preferred to make the installation at the time the meter is installed, at which time the throat member 11 would be removed. If the meter has previously been installed, then dirt is removed from around the throat member 11 and said throat member removed from the upper end of the meter box 9. The wall member 21 is of a shape and size to correspond to the shape and size defined by the interior surfaces 25 of the meter box. The wall member then is slid downwardly into the meter box until it engages the upper end of the register portion 20. It is pushed downwardly with sufficient pressure to cause the register portion to make a mark on the lower surface of the wall 21, said wall is then withdrawn from the meter box and the opening 26 cut so it corresponds in shape and size to the periphery of the register portion 20. The wall then is returned to the meter box and pushed downwardly until the register portion extends through the opening 26 whereby the wall member 21 rests on and is supported by the bonnet of the body portion of the meter and the frictional engagement of the peripheral edge 24 with the inner surface of the meter box. The throat portion is returned in place, the cover 17 applied to the seat 16, and dirt returned to around the throat.

Some meter boxes do not have throat portions and the cover is of a size to fit in a recess in the upper end of the meter box. The insulation of the protector is the same except the access is provided by merely removing the cover.

When installed, the wall member 21 forms an insulation barrier between the upper portion of the meter box chamber and the portion containing the meter so that low temperatures in the upper portion resulting from below zero temperatures in the atmosphere are retained above the wall 21 and the ground temperatures surrounding the lower portion or meter compartment 23 serve to protect the meter and prevent freezing thereof.

When it is desired to read the meter, the dial 28 of the register portion is visible for reading. The wall member 21 is of long life and once installed does not need to be removed except when it is necessary to repair, replace the meter or shut off the water.

It is to be understood that while I have illustrated and described a certain form of my invention, it is not to be limited to the specific form or arrangement of parts herein described and shown.

What I claim and desire to secure by Letters Patent is:

1. A water meter freeze protector structure comprising,
  a. a meter well having a meter box therein, said meter box being tubular and on end in the well, said meter box having a wall inner surface defining a meter chamber below ground surface and with a lower portion below a normal frost line in said ground,
  b. a cover member removably mounted relative to said meter well substantially at ground level to close said chamber,
  c. a water meter positioned within said chamber in said lower portion thereof and having water connections to pipe extending to and from the chamber, said meter having a body with a register containing portion upstanding therefrom and visible from above the meter well when the cover member is removed,
  d. an insulating wall member of substantially rigid temperature insulation material removably positioned in the meter box above and adjacent said meter body, said wall member being substantially horizontal and having a periphery frictionally engaged with the inner surface of the meter box whereby said wall member forms an insulating barrier between the upper portion of the meter box chamber and the portion of said chamber in which the meter is located, said insulating wall member having a centrally arranged opening aligned with the meter register whereby the meter register is readable with said wall member in place.

2. A water meter freeze protector structure as set in claim 1 wherein,
  a. the meter register portion is received in the centrally arranged opening in said wall member and said insulating wall member rests on the water meter body whereby said body cooperates with the frictional engagement with the meter box wall to support said insulating wall member.

3. A water meter freeze protector structure as set forth in claim 1 wherein,
  a. the meter box upper portion has a throat piece for reducing the size of the open upper end with said throat piece having the closure seat for seating of the cover member.

4. A water meter freeze protector structure as set forth in claim 1 wherein,
  a. the insulation wall member is of substantially rigid synthetic resin foam and the peripheral edge thereof slidably engages the inner surface of the meter box wall.

5. A water meter freeze protector structure as set forth in claim 4 wherein,
  a. the insulation wall member is of substantially rigid synthetic resin foam of a class consisting of styrene foam, polyethylene foam, or polyurethane foam, and having a density in the nature of one-half to four pounds per cubic foot.

* * * * *